(12) United States Patent
Xie et al.

(10) Patent No.: US 12,156,174 B2
(45) Date of Patent: Nov. 26, 2024

(54) PAGING METHOD AND DEVICE (71) Applicant: VIVO MOBILE COMMUNICATION CO., LTD., Guangdong (CN)

(72) Inventors: Zhenhua Xie, Guangdong (CN); Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 450 days.

(21) Appl. No.: 17/680,385

(22) Filed: Feb. 25, 2022

(65) Prior Publication Data
US 2022/0182973 A1 Jun. 9, 2022

Related U.S. Application Data

(63) Continuation of application No. PCT/CN2020/111688, filed on Aug. 27, 2020.

(30) Foreign Application Priority Data

Aug. 27, 2019 (CN) .......................... 201910798446.6

(51) Int. Cl.
*H04W 68/02* (2009.01)
*H04W 4/20* (2018.01)
*H04W 88/02* (2009.01)

(52) U.S. Cl.
CPC .............. *H04W 68/02* (2013.01); *H04W 4/20* (2013.01); *H04W 88/02* (2013.01)

(58) Field of Classification Search
CPC ....... H04W 68/02; H04W 4/20; H04W 88/02; H04W 76/11; H04W 76/10
See application file for complete search history.

(56) References Cited

U.S. PATENT DOCUMENTS 11,463,918 B2 * 10/2022 Xin ........................ H04W 76/12
11,588,741 B2 * 2/2023 Yu ......................... H04W 28/10
(Continued)

FOREIGN PATENT DOCUMENTS

| CN | 1852596 A | 10/2006 |
| CN | 104811960 A | 7/2015 |

(Continued)

OTHER PUBLICATIONS

Sperotto, Anna, et al. "An overview of IP flow-based intrusion detection." IEEE communications surveys & tutorials 12.3 (2010): 343-356. (Year: 2010).*

(Continued)

*Primary Examiner* — Sharad Rampuria (74) *Attorney, Agent, or Firm* — BROOKS KUSHMAN P.C.

(57) ABSTRACT

A paging method and a device, so as to resolve a problem that a network device cannot determine a matching value related to a mobile terminated service. The method is executed by a first network function, including: sending service matching information and service-flow relationship information to a network device, or sending flow matching information; where the service matching information is used for obtaining a matching value based on service information or service type information; the service-flow relationship information is used for obtaining service information or (Continued)

500

Send service–flow relationship information to a first network function, so that the first network function generates flow matching information based on the service–flow relationship information and service matching information; or send the service–flow relationship information to a network device through the first network function ~ S502 service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

18 Claims, 5 Drawing Sheets

(56) References Cited

U.S. PATENT DOCUMENTS

| | | | |
|---|---|---|---|
| 11,689,956 B2* | 6/2023 | Li | H04W 8/08 370/229 |
| 2018/0062945 A1 | 3/2018 | Ni et al. | |
| 2019/0007992 A1 | 1/2019 | Kim et al. | |
| 2019/0069194 A1 | 2/2019 | Jun et al. | |
| 2019/0075511 A1 | 3/2019 | Ryu et al. | |
| 2019/0182737 A1 | 6/2019 | Futaki et al. | |
| 2021/0022112 A1 | 1/2021 | Deng | |

FOREIGN PATENT DOCUMENTS

| | | | |
|---|---|---|---|
| CN | 107018542 A | 8/2017 | |
| CN | 107624230 A | 1/2018 | |
| CN | 109526252 A | 3/2019 | |
| CN | 109818917 A | 5/2019 | |
| CN | 110166503 A | 8/2019 | |
| JP | 2021513785 A | 5/2021 | |
| WO | 2018202351 A1 | 11/2018 | |
| WO | 2018231007 A1 | 12/2018 | |

OTHER PUBLICATIONS

Extended European Search Report for Application No. 20859095.0-1215, dated Sep. 9, 2022, 7 Pages.
First Office Action for Japanese Application No. 2022-512804, dated Mar. 30, 2023, 3 Pages.
Huawei, HiSilicon, Ericsson, "TS 23.501 Clean-ups for RAN Paging Strategy Handling" SA WG2 Meeting #124, Reno, Nevada, Nov. 2017, S2-179052, 3 Pages.
Intel, Verizon, AT&T, Sony, , MediaTek Inc., "Paging cause introduction" SA WG2 Meeting #129-BIS, West Palm Beach, FL, Nov. 2018, S2-1812349, 3 Pages.
First Office Action for Chinese Application No. 201910798446.6, dated Feb. 19, 2021, 7 Pages.
Second Office Action for Chinese Application No. 201910798446.6, dated Jun. 21, 2021, 8 Pages.
International Search Report and Written Opinion for Application No. PCT/CN2020/111688, dated Nov. 18, 2020, 7 Pages.
5G, "3rd Generation Partnership Project; Technical Specification Group Services and System Aspects; Procedures for the 5G System; Stage 2," 3GPP TS 23.502, Jun. 2019, V.16.1.1, Release 16, 494 Pages (16 parts).

* cited by examiner

100

Send service matching information and service–flow relationship information to a network device, or send flow matching information to the network device ~ S102

Receive service matching information and service–flow relationship information from a first network function, or receive flow matching information from the first network function ~ S402

| Send service–flow relationship information to a first network function, so that the first network function generates flow matching information based on the service–flow relationship information and service matching information; or send the service–flow relationship information to a network device through the first network function | ~ S502 |

PAGING METHOD AND DEVICE

CROSS-REFERENCE TO RELATED APPLICATIONS

This application is a continuation of International Application No. PCT/CN2020/111688 filed on Aug. 27, 2020, which claims priority to Chinese Patent Application No. 201910798446.6, filed on Aug. 27, 2019, which are incorporated herein by reference in their entireties.

TECHNICAL FIELD

Embodiments of this disclosure relate to the communications field, and in particular, to a paging method and a device.

BACKGROUND

The 3rd Generation Partnership Project (3GPP) defines a process of paging a user for a mobile terminated service of a mobile network with a specific procedure as follows.

First, a terminal establishes a session connection to a network, including a wireless connection between the terminal and a base station, and a core network connection between the base station and a user plane function (UPF). The terminal implements communication with an application server through the session connection; and after determining that the terminal has no user data transmission for a specified period of time, the base station determines to suspend the terminal, that is, to release radio resources between the base station and the terminal, but still retain the core network connection between the base station and the user plane function.

Then, the application server sends application data. After the application data arrives at the UPF, the UPF forwards the application data to the base station through the core network connection.

Finally, the base station sends a paging message, for example, a Page message, to the terminal, and after receiving the paging message, the terminal initiates a wireless connection re-establishment procedure to re-establish a wireless connection between the terminal and the base station.

In the related art, the base station can receive data related to the mobile terminated service, and the like. However, how to obtain, based on the data related to the mobile terminated service, a matching value related to the mobile terminated service has become a technical issue to be resolved urgently in the related art.

SUMMARY

An objective of embodiments of this disclosure is to provide a paging method and a device.

According to a first aspect, a paging method is provided, where the method is executed by a first network function, and the method includes:
sending service matching information and service-flow relationship information to a network device, or sending flow matching information to the network device; where
the service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

According to a second aspect, a paging method is provided, where the method is executed by a network device, and the method includes:
receiving service matching information and service-flow relationship information from a first network function, or receiving flow matching information from the first network function; where
the service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

According to a third aspect, a paging method is provided, where the method is executed by a second network function, and the method includes:
sending service-flow relationship information to a first network function, so that the first network function generates flow matching information based on the service-flow relationship information and service matching information; or sending the service-flow relationship information to a network device through the first network function; where
the service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

According to a fourth aspect, a network device is provided, where the network device includes: a first network function, configured to send service matching information and service-flow relationship information to another network device, or send flow matching information to the another network device; where
the service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

According to a fifth aspect, a network device is provided, where the network device includes: a receiving module, configured to receive service matching information and service-flow relationship information from a first network function, or receive flow matching information from the first network function; where     the service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

According to a sixth aspect, a network device is provided, where the network device includes: a second network function, configured to send service-flow relationship information to a first network function, so that the first network function generates flow matching information based on the service-flow relationship information and service matching information; or send the service-flow relationship information to another network device through the first network function, where     the service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

According to a seventh aspect, a network device is provided, where the network device includes a processor, a memory, and a computer program stored in the memory and capable of running on the processor, and when the computer program is executed by the processor, the steps of the paging methods according to the first aspect, the second aspect, and the third aspect are implemented.

According to an eighth aspect, a computer-readable storage medium is provided, where a computer program is stored in the computer-readable storage medium, and when the computer program is executed by a processor, the steps of the paging methods according to the first aspect, the second aspect, and the third aspect are implemented.

BRIEF DESCRIPTION OF DRAWINGS

To describe the technical solutions in embodiments of this disclosure more clearly, the following briefly describes the accompanying drawings required for describing the embodiments of this disclosure. A person of ordinary skill in the art may derive other drawings from these accompanying drawings without creative efforts.

DETAILED DESCRIPTION

To make the objectives, technical solutions, and beneficial technical effects of this disclosure clearer, the following describes this disclosure in detail with reference to specific embodiments. It should be understood that the embodiments described in this specification are merely intended to explain this disclosure, but not to limit this disclosure.

For simplicity, only some numerical ranges are explicitly disclosed in this specification. However, any lower limit may be combined with any upper limit to form an unspecified range, any lower limit may be combined with another lower limit to form an unspecified range, and similarly, any upper limit may be combined with any other upper limit to form an unspecified range. In addition, although not explicitly stated, each point or a single numerical value between end points of a range is included in the range. Therefore, each point or a single numerical value may serve as its own lower limit or upper limit and be combined with any other point or single numerical value or another lower limit or upper limit to form an unspecified range.

In the descriptions of this specification, it should be noted that "more than" or "less than" is inclusive of the present number and that "more" in "one or more" means two or more than two, unless otherwise specified.

The foregoing summary of this disclosure is not intended to describe each disclosed embodiment or each implementation of this disclosure. The following descriptions illustrate example embodiments more specifically by using examples. In many places throughout this application, guidance is provided through a series of embodiments. These embodiments may be used in various combinations. In each embodiment, enumeration is only representative but should not be interpreted as exhaustive.

It should be understood that, the technical solutions in the embodiments of this disclosure may be applied to various communications systems, such as a Long Term Evolution (LTE) system, an LTE frequency division duplex (FDD) system, LTE time division duplex (TDD), a Universal Mobile Telecommunications System (UMTS), a Worldwide Interoperability for Microwave Access (WiMAX) communications system, a 5G system or in other words, a new radio (NR) system, or a later evolved communications system.

In the embodiments of this disclosure, a terminal device may include but is not limited to a mobile station (MS), a mobile terminal, a mobile telephone, user equipment (UE), a handset, portable equipment, a vehicle, and the like. The terminal device may communicate with one or more core networks via a radio access network (RAN). For example, the terminal device may be a mobile phone (or referred to as a "cellular" phone), or a computer having a wireless communication function. The terminal device may alternatively be a portable, pocket-sized, handheld, computer built-in, or in-vehicle mobile apparatus.

In the embodiments of this disclosure, a network device is an apparatus deployed in the radio access network and configured to provide a wireless communication function for the terminal device. The network device may be a base station. The base station may include a macro base station, a micro base station, a relay station, an access point, and the like in various forms. In a system using a different radio access technology, a device having base station functions may have a different name. For example, in an LTE network, the device having base station functions is referred to as an evolved NodeB (eNB or eNodeB), in a 3rd generation (3G) network, the device base station functions is referred to as a NodeB (Node B), or the device base station functions is referred to as the network device in the later evolved communications system, or the like. However, the wording does not constitute a limitation.

Figure 1:
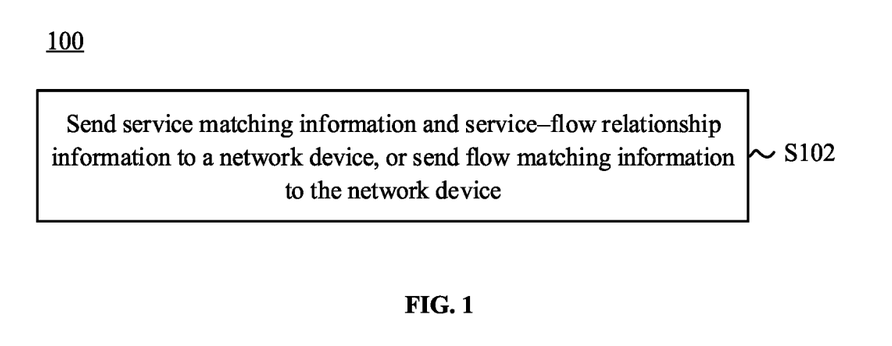
FIG. 1 is a schematic flowchart of a paging method according to an embodiment of this disclosure.

As shown in FIG. 1, an embodiment of this disclosure provides a paging method 100. The method may be executed by a first network function, for example, by an access and mobility management function (AMF), a session management function (SMF), or a UPF. In other words, the method may be executed by software or hardware installed on a network device side. The method includes the following step.

S102: Send service matching information and service-flow relationship information to a network device, or send flow matching information to the network device.

The flow matching information may be generated by the first network function based on the service matching information and the service-flow relationship information.

As previously described, this embodiment may be executed by an AMF, SMF or UPF, and the network device may specifically be a base station.

The following first describes the service matching information, the service-flow relationship information, and the flow matching information.

The service-flow relationship information is used for obtaining service information or service type information based on a flow identifier, or for obtaining service information or service type information based on "a session identifier and a flow identifier".

The service information and/or the service type information mentioned in the embodiments of this specification may specifically include at least one of the following:
  (1) a name, for example, WeChat, IMS voice call, an instant messaging type, a game type;
  (2) an identifier, for example, 1 for WeChat, 2 for IMS voice call, 3 for an instant messaging type, 4 for a game type; and
  (3) rule information, where the rule information includes at least one of the following: one or more IP addresses, where the IP address may include a number or a wildcard; one or more port numbers, where the port number may include a number or a wildcard; one or more pieces of protocol information (for example, RTP over TCP); and one or more pieces of codec information, for example, a voice service may be identified through a voice codec, and a video service can be identified through a video codec.

Generally, the service information includes a service name, for example, WeChat and IMS voice call, and the service type information includes a service type name, for example, an instant messaging type, and a game type.

Generally, the service information includes a service identifier, for example, 1 for WeChat, and 2 for IMS voice call, and the service type information includes a service type identifier, for example, 1 for an instant messaging type, and 2 for a game type.

Generally, the service information includes service rule information, for example, rule information of one or more services; and the service type information includes service type rule information, for example, rule information of one or more service types.

Optionally, the service-flow relationship information may include one or more service-flow relationships, and any one of target service-flow relationships may specifically include one of the following:
  (1) a target flow identifier and one or more pieces of target service information;
  (2) a target flow identifier, a target session identifier, and one or more pieces of target service information;
  (3) a target flow identifier, and one or more pieces of target service type information; and
  (4) a target flow identifier, a target session identifier, and one or more pieces of target service type information.

It should be noted that only one (target) service-flow relationship is used herein as an example for description, but in fact, one or more service-flow relationships included in the service-flow relationship information may be as shown in the foregoing example.

It also should be noted that for any phrase "target . . . " mentioned in the embodiments of this specification, such as target service information, the term "target" therein is merely intended to facilitate introduction of one specific piece of service information included, and does not represent other specific meanings.

The service matching information is used for obtaining a matching value based on the service information or the service type information.

For detailed explanation of the service information and the service type information, reference may be made to the foregoing description.

Optionally, the service matching information includes one or more service matching relationships, and any one of service matching relationships (for ease of differentiation, hereinafter referred to as target service matching relationship) may include:
  a target matching value and one or more pieces of target service information, where the target service information is used to indicate a service related to the target matching value; or
  a target matching value and one or more pieces of target service type information, where the target service type information is used to indicate a service type related to the target matching value.

Certainly, one service matching relationship generally may include one matching value, and matching values included in different service matching relationships are different.

Optionally, the service matching information further includes validity period information.

The above-mentioned target service matching relationship further includes at least one of the following:
  (1) one or more pieces of high-priority service information, where a service corresponding to the high-priority service information is capable of preempting a service corresponding to the target service information;
  (2) one or more pieces of high-priority service type information, where a service corresponding to the high-priority service type information is capable of preempting a service corresponding to the target service type information;
  (3) one or more pieces of low-priority service information, where a service corresponding to the low-priority service information is incapable of preempting a service corresponding to the target service information;
  (4) one or more pieces of low-priority service type information, where a service corresponding to the low-priority service type information is incapable of preempting a service corresponding to the target service type information;

(5) priority information of a service corresponding to the target service information; and (6) priority information of a service corresponding to the target service type information.

It should be noted that only one target service matching relationship is used herein as an example for description, but in fact, one or more service matching relationships included in the service matching information may be as shown in the foregoing example.

The flow matching information is used for obtaining a matching value based on a flow identifier, or for obtaining a matching value based on a session identifier and a flow identifier.

Optionally, the flow matching information includes one or more flow matching relationships, and any one of flow matching relationships (for ease of differentiation, hereinafter referred to as target flow matching relationship) may include:

a target matching value and one or more target flow identifiers; or, a target matching value and one or more target identifier pairs, where the target identifier pair includes the target flow identifier and a target session identifier.

Optionally, the flow matching information further includes validity period information.

In the paging method provided in this embodiment of this disclosure, the network function may send the service matching information and the service-flow relationship information, or the flow matching information to the network device, so that the network device can obtain the matching value from the service matching information and the service-flow relationship information based on the flow identifier or "the flow identifier and the session identifier", or obtain the matching value from the flow matching information, thereby resolving the problem that the network device cannot determine the matching value related to a mobile terminated service, and improving communication effectiveness.

In order to describe in detail the paging method provided in the foregoing embodiment of this disclosure, the following is described with reference to several specific embodiments.

Embodiment 1

Figure 2:
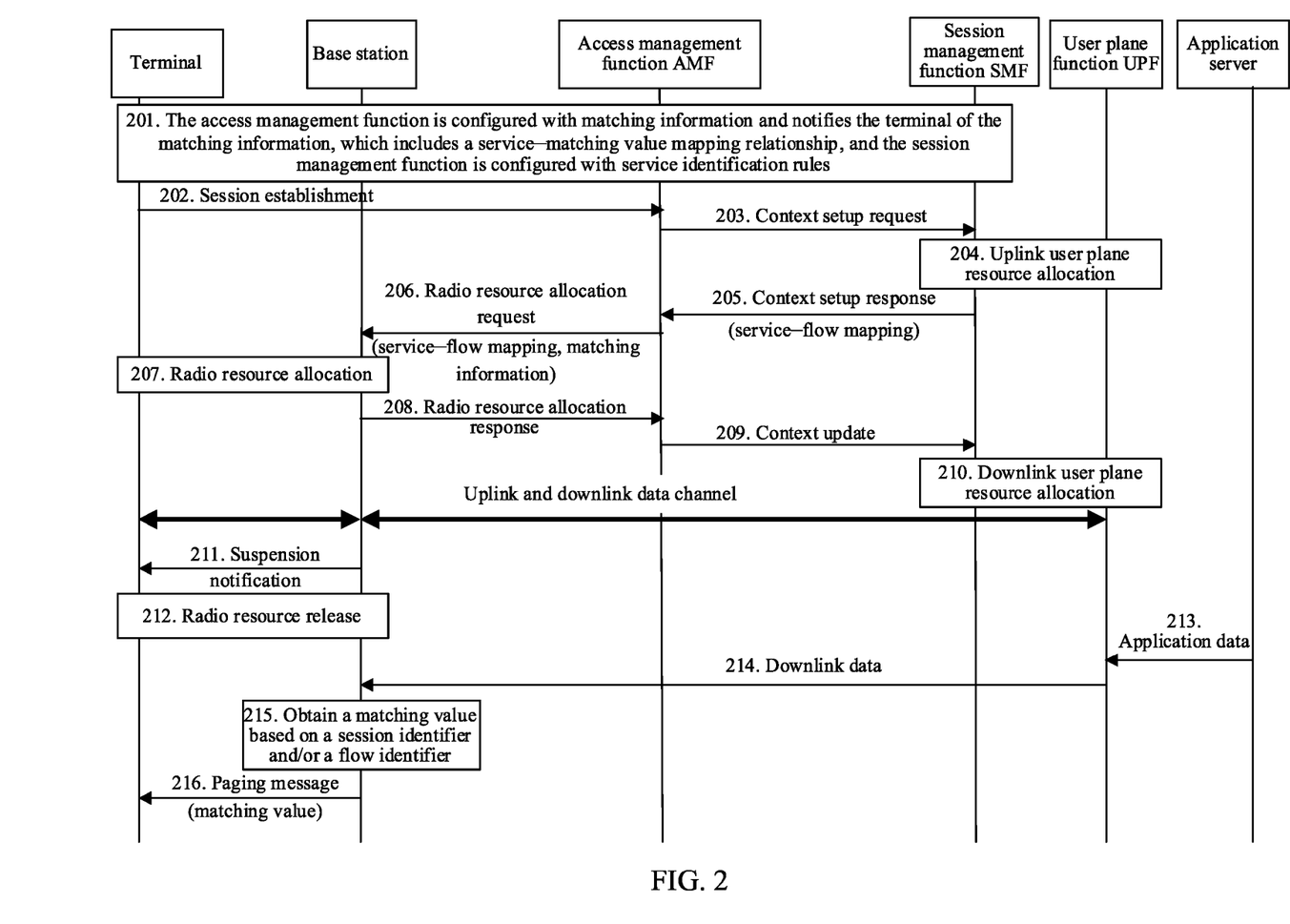
FIG. 2 is a flowchart of establishing and then suspending a service, and causing radio paging in a paging method according to an embodiment of this disclosure.

FIG. 2 is a process of establishing and then suspending a service, and causing radio paging in a paging method according to an embodiment of this disclosure. As shown in FIG. 2, the embodiment includes the following steps.

Step 201: An AMF is configured with service matching information, which includes one or more service matching relationships. Any one of service matching relationships includes at least a matching value (for example, a policy identifier in a policy matching relationship, and a cause value in a cause matching relationship) and one or more pieces of service information corresponding to the matching value, or one or more pieces of service type information corresponding to the matching value.

The following is described by using an example in which a service matching relationship includes a matching value and one or more pieces of service information corresponding to the matching value. It can be understood that when the service matching relationship includes a matching value and one or more pieces of service type information corresponding to the matching value, an execution process thereof is similar to the foregoing execution process. Details are not repeated herein.

The service matching relationship may be a policy matching relationship, or may be a cause matching relationship. The service matching information may further include validity period information, and the validity period indicates that related information is to be updated before expiration.

Optionally, if the service matching information is policy matching information, the service matching information may further include priority information corresponding to each piece of service information, or one or more pieces of high-priority service information corresponding to each piece of service information, or one or more pieces of low-priority service information corresponding to each piece of service information. A plurality of pieces of service information may correspond to a same one or more pieces of high-/low-priority service information.

A service indicated by the high-priority service information may preempt services indicated by one or more pieces of service information corresponding to the high-priority service information; and a service indicated by low-priority service information shall not interfere services indicated by one or more pieces of service information corresponding to the low-priority service information.

The above-mentioned service information or high-/low-priority service information may include a service name, for example, WeChat, QQ, IMS voice call, IMS video call, a game name, or may include a service type name and/or a service type identifier, for example, a service type identifier 1 corresponding to a service type name "instant messaging", such as WeChat or QQ, a service type identifier 2 corresponding to a service type name "IMS", such as voice or video communication, and service type identifier 3 corresponding to a service type name "game", or may include a service identifier, for example, 1 for WeChat, 2 for IMS Voice call, and 3 for QQ.

Optionally, the above-mentioned service information or high-/low-priority service information may further include a session identifier and/or flow identifier corresponding to each service/service type in the process of establishing a session by a terminal (that is, "a session identifier and a flow identifier", a session identifier, or a flow identifier), or may include service initiator information, such as an IMS calling number.

One matching value corresponding to a plurality of pieces of service information may also be expressed as each piece of service information in the plurality pieces of service information corresponding to a same matching value; and a plurality of pieces of service information may correspond to a same one or more pieces of high-/low-priority service information.

An SMF is configured with service rule information (rule information for short) which is alternatively referred to as service identification rule. The service rule information includes at least one of the following: one or more IP addresses, where the IP address may include a number or a wildcard; one or more port numbers, where the port number may include a number or a wildcard; one or more pieces of protocol information (for example, RTP over TCP); and one or more pieces of codec information, for example, a voice service may be identified through a voice codec, and a video service can be identified through a video codec.

Step 202: The terminal is triggered by a network (for example, a paging message is received) or actively triggers (for example, there is data to be sent) to send a session establishment message to the AMF on the network side, for example, send a PDU Session Establishment Request message.

Step 203: The AMF selects the SMF, and sends a context setup request to the SMF, for example, sends a Create SM Context Request message.

Step 204: The SMF generates a session identifier (PDU Session ID) for a session to be established, assigns a flow identifier (QFI-QoS Flow ID) to each service/service type/application included in the session, generates a corresponding packet detection rule (including at least one of an identification rule, a flow identifier, and a session identifier) according to the identification rule of each service/service type/application and the corresponding flow identifier, and sends the packet detection rule together to a UPF when notifying the UPF to allocate uplink user plane resources.

Step 205: The SMF sends a context setup response message to the AMF, for example, sends a Create SM Context Response message, which carries service-flow relationship information. For detailed description of the service-flow relationship information, reference may be made to the foregoing embodiments.

The AMF may generate flow matching information according to service matching information and service-flow relationship information, that is, replacing the service information (or service type information) in the service matching information with a corresponding flow identifier, or with "a session identifier and a flow identifier".

In the foregoing service matching relationship, if the service information also includes one or more pieces of high-priority service information, one or more pieces of low-priority service information, or priority information, that correspond to the service information, the AMF may alternatively replace the high-/low-priority service information or the like with a flow identifier or "a session identifier and a flow identifier", or certainly, may not perform replacement but simply add the flow identifier or "the session identifier and the flow identifier" corresponding to the high-/low-priority service information or the like.

Optionally, the SMF may alternatively carry service-flow relationship information in a communication message forwarding request message (such as a Communication N1N2 Message Transfer message) sent to the AMF. Information about the allocated uplink resource (for example, an uplink tunnel identifier) may be carried in the context setup response message, or in the communication message forwarding request, and sent to a base station.

Step 206: The AMF sends a radio resource allocation request to the base station, for example, sends an N2 PDU Session Request message.

Optionally, the AMF may transparently transmit, to the base station through this radio resource allocation request, the service-flow relationship information sent by the SMF, and carry the service matching information in this message.

Optionally, the AMF uses this radio resource allocation request to carry the flow matching information, and uplink resource information sent by the SMF may be transparently transmitted to the base station by the AMF using this message.

In another embodiment, in another process, such as a terminal registration process, the AMF first sends the service matching information to the base station, for example, sends a Registration Accept message carrying the service matching information to the base station.

Step 207: The base station and the terminal negotiate allocation of radio bearer resources.

Step 208: The base station sends a radio resource allocation response to the AMF, for example, sends an N2 PDU Session Response message, which carries downlink resource information of the base station.

Step 209: The AMF sends a context update to the SMF, for example, sends an Update SM Context message, and the AMF uses this message to forward the downlink resource information to the SMF.

Step 210: The SMF notifies the UPF to allocate downlink user plane resources and notifies the UPF of the downlink resource information.

Hereto, the terminal has established uplink and downlink user plane communication connections with the network, including the wireless connection between the terminal and the base station and the core network connection between the base station and the UPF.

Step 211: At a time point after the establishment of the session, the base station determines to suspend the terminal and release the radio resources, and then sends a message to notify the terminal of the suspension, for example, sends an RRC Suspend message.

Step 212: The base station and the terminal release the radio resources.

Step 213: At a subsequent time point, an application server sends application data or information related to the application data to the terminal. The following is described by using an example in which the application server sends application data.

Step 214: The application data arrives at the UPF. The UPF matches, based on configuration information obtained during resource allocation, user data onto a corresponding core network connection, and transmits downlink data to the base station through the core network connection. The downlink data may include at least one of the session identifier and the flow identifier in addition to the application data.

Step 215: The base station finds, based on at least one of the session identifier and the flow identifier, a matching value corresponding to the application data, for example, finds the service information from the service-flow relationship information, and then finds the matching value from the service matching information, or directly finds the matching value from the flow matching information.

Step 216: The base station sends a paging message, such as a Page message, to the terminal, and the paging message carries the matching value. After receiving a message paging the terminal itself, the terminal determines, based on the matching value, whether to respond to the paging message, that is, initiates a re-establishment request to establish a wireless connection to a mobile network, or prompts the user that there is service data to receive.

Optionally, the terminal side also stores service matching information.

After receiving a paging message with a matching value, the terminal determines, based on the matching value, whether to respond to the paging message, that is, whether to initiate a service request to establish a connection to the mobile network.

For example, the terminal determines, based on priority information corresponding to the matching value, whether to respond, or determines, based on an acceptable matching value of a currently executed service, whether to respond, or determines, based on whether a matching value corresponding to service information of another service that a currently executed service may receive a response therefrom contains the matching value in the paging message, whether to respond.

For another example, the terminal finds, based on the matching value, service information corresponding to the matching value, and prompts a user of the service information, so that the user determines whether to accept the corresponding service.

This implementation is particularly suitable for a terminal with a plurality of universal subscriber identity modules (USIM) because paging for a USIM card may interrupt an ongoing service used by the user using another USIM, and this implementation can actively prompt a paging-related service, so that the terminal may choose whether to accept the paging according to user preferences, which improves communication flexibility and user experience.

Embodiment 2

Figure 3:
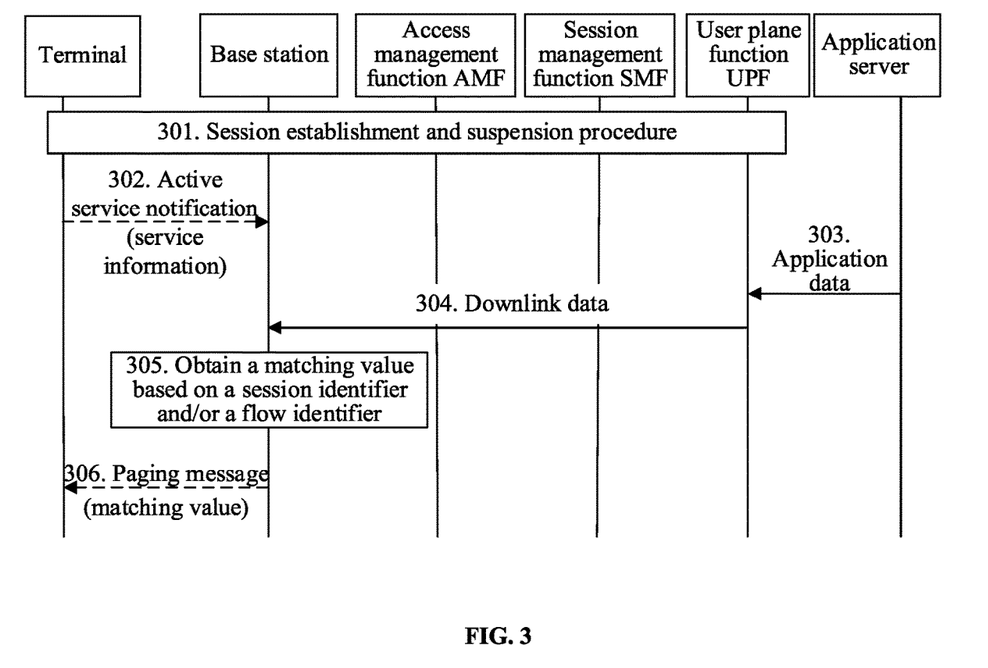
FIG. 3 is a flowchart of establishing and then suspending a service, and causing radio paging in a paging method according to another embodiment of this disclosure.

FIG. 3 is a flowchart of establishing and then suspending a service, and causing radio paging in a paging method according to an embodiment of this disclosure. As shown in FIG. 3, the embodiment includes the following steps.

Step 301: Same as described in steps 201 to 212, that is, the terminal establishes a session through a mobile network and suspends the session.

Step 302: Optionally, the terminal notifies a base station of service information of a currently active service of another USIM, for example, sends an RRC Early Data Request message, which carries the service information. In this embodiment, a plurality of USIMs may be installed on the terminal.

Step 303: At a subsequent time point, an application server sends application data or information related to the application data to the terminal. The following is described by using an example of sending application data.

Step 304: The application data arrives at a UPF. The UPF matches, based on configuration information obtained during resource allocation, user data onto a corresponding core network connection, and transmits downlink data to the base station through the core network connection. The downlink data includes at least one of a session identifier and a flow identifier in addition to the application data.

Step 305: The base station finds, based on at least one of the session identifier and the flow identifier, a matching value corresponding to the application data, for example, finds the service information from the service-flow relationship information, and then finds the matching value from the service matching information, or directly finds the matching value from the flow matching information.

In this embodiment, the base station may determine, based on the flow identifier, or based on "the session identifier and the flow identifier", the service-flow relationship information, and the service matching information, or based on the flow identifier, or "the session identifier and the flow identifier", and the flow matching information, whether to perform paging.

For example, the base station finds a priority of corresponding service information (for ease of differentiation, hereinafter referred to as target service information) in the service matching information, finds, based on service information (hereinafter referred to as active service information) corresponding to a currently active service on the terminal, a corresponding priority from the service matching information, and compares the two priorities. If the priority of the target service information is lower, that is, lower than the priority of the active service information, the base station rejects to perform paging, and optionally notifies an SMF. Alternatively, the base station finds low-priority service information corresponding to the active service information in the service matching information, and rejects to perform paging if the target service information is in the foregoing low-priority service information; or the base station finds high-priority service information corresponding to the active service information in the service matching information, and performs paging if the target service information is in the high-priority service information.

For another example, the base station finds based on the flow matching information, a priority of a flow identifier (referred to as target flow identifier) corresponding to service data and a priority of the active service information, and compares the two priorities. If the priority of the target flow identifier is lower, the base station rejects to perform paging, and optionally notifies an SMF. Alternatively, the base station finds the low-priority service information corresponding to the active service information in the flow matching information, and rejects to perform paging if the target flow identifier is in the low-priority service information; or the base station finds the high-priority service information corresponding to the active service information in the flow matching information, and performs paging if the target flow identifier is in the high-priority service information.

Step 306: When performing paging, the base station sends a paging message, such as a Page message, to the terminal, and the paging message carries the matching value.

After receiving a paging message with a matching value, the terminal determines, based on the matching value, whether to respond to the paging message, that is, whether to initiate a service request to establish a connection to the mobile network.

Optionally, the terminal side also stores service matching information.

For example, the terminal determines, based on priority information corresponding to the matching value, whether to respond, or determines, based on an acceptable matching value of a currently executed service, whether to respond, or determines, based on whether a matching value corresponding to service information of another service that a currently executed service may receive a response therefrom contains the matching value in the paging message, whether to respond.

For another example, the terminal finds, based on the matching value, service information corresponding to the matching value, and prompts a user of the service information, so that the user determines whether to accept the corresponding service.

This implementation is particularly suitable for a terminal with a plurality of USIMs. This implementation can actively prompt a paging-related service, so that the terminal may choose whether to accept the paging according to user preferences, which improves communication flexibility and user experience.

It should be noted that in step 305, the base station has determined whether to perform paging, and after the paging is performed, the terminal determines again whether to respond to the paging. This implementation mainly considers that the terminal may have generated new service matching information without promptly notifying the network, which improves autonomy of the terminal for determining whether to respond to the paging, and helps improving user experience.

The foregoing describes in detail the paging methods according to the embodiments of this disclosure with reference to FIG. 1 to FIG. 3. The following describes in detail a paging method according to another embodiment of this disclosure with reference to FIG. 4. It can be understood that description from a network device side is the same as the description from the first network function side in the method shown in FIG. 1 to FIG. 3, and therefore relevant description is appropriately omitted to avoid repetition.

Figure 4:
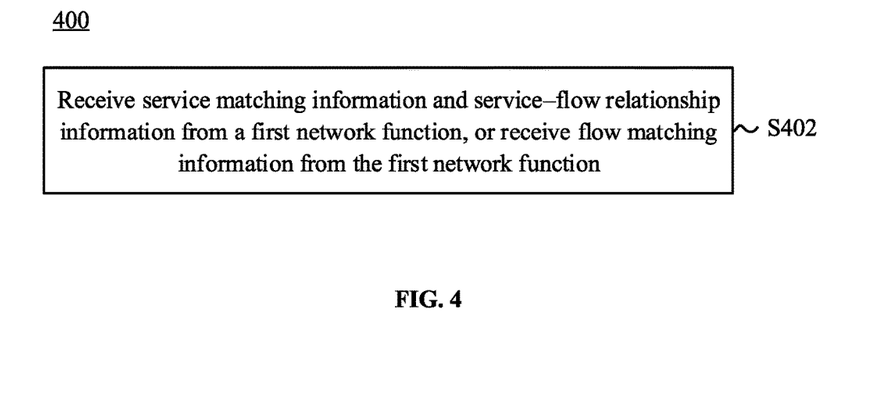
FIG. 4 is a schematic flowchart of a paging method according to another embodiment of this disclosure.

FIG. 4 is a schematic implementation flowchart of a paging method according to an embodiment of this disclosure, which may be applied on a network device side. As shown in FIG. 4, the method 400 includes the following step.

S402: Receive service matching information and service-flow relationship information from a first network function, or receive flow matching information from the first network function.

The service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

In the paging method provided in this embodiment of this disclosure, the network device may receive the service matching information and the service-flow relationship information, or the flow matching information from the network function, so that the network device can obtain the matching value from the service matching information and the service-flow relationship information based on the flow identifier or "the flow identifier and the session identifier", or obtain the matching value from the flow matching information, thereby resolving the problem that the network device cannot determine the matching value related to a mobile terminated service, and improving communication effectiveness.

Optionally, in an embodiment, after step 402, the method further includes:
receiving data from a network; and
sending a paging message to a terminal device, where the paging message carries a target matching value; where the data carries a target flow identifier, or carries a target flow identifier and a target session identifier.

Optionally, in an embodiment, the service matching information includes one or more service matching relationships, and one target service matching relationship in the service matching information includes:
a target matching value and one or more pieces of target service information; or,
a target matching value and one or more pieces of target service type information; where
the target service information is used to indicate a service related to the target matching value, and the target service type information is used to indicate a service type related to the target matching value.

Optionally, in an embodiment, the target service matching relationship further includes at least one of the following:
one or more pieces of high-priority service information, where a service corresponding to the high-priority service information is capable of preempting a service corresponding to the target service information;
one or more pieces of high-priority service type information, where a service corresponding to the high-priority service type information is capable of preempting a service corresponding to the target service type information;
one or more pieces of low-priority service information, where a service corresponding to the low-priority service information is incapable of preempting a service corresponding to the target service information;
one or more pieces of low-priority service type information, where a service corresponding to the low-priority service type information is incapable of preempting a service corresponding to the target service type information;
priority information of a service corresponding to the target service information; and
priority information of a service corresponding to the target service type information.

Optionally, in an embodiment, the flow matching information includes one or more flow matching relationships, and one target flow matching relationship in the flow matching information includes:
a target matching value and one or more target flow identifiers; or,
a target matching value and one or more target identifier pairs, where the target identifier pair includes the target flow identifier and a target session identifier.

Optionally, in an embodiment, the service-flow relationship information includes one or more service-flow relationships, and one target service-flow relationship in the service-flow relationship information includes:
a target flow identifier and one or more pieces of target service information; or
a target flow identifier, a target session identifier, and one or more pieces of target service information; or
a target flow identifier, and one or more pieces of target service type information; or
a target flow identifier, a target session identifier, and one or more pieces of target service type information.

Optionally, in an embodiment, after step 402, the method further includes:
receiving currently active service information (or referred to as service information corresponding to a currently active service) from the terminal device; and
based on the currently active service information, first information, and second information, determining to reject to send the paging message; where
the first information includes the flow matching information; or the first information includes the service matching information and the service-flow relationship information; and the second information includes the target flow identifier; or the second information includes the target session identifier and the target flow identifier.

The foregoing describes in detail the paging methods according to the embodiments of this disclosure with reference to FIG. 1 to FIG. 3. The following describes in detail a paging method according to another embodiment of this disclosure with reference to FIG. 5. It can be understood that description from a second network function side is the same as the description from the first network function side in the method shown in FIG. 1 to FIG. 3, and therefore relevant description is appropriately omitted to avoid repetition.

Figure 5:
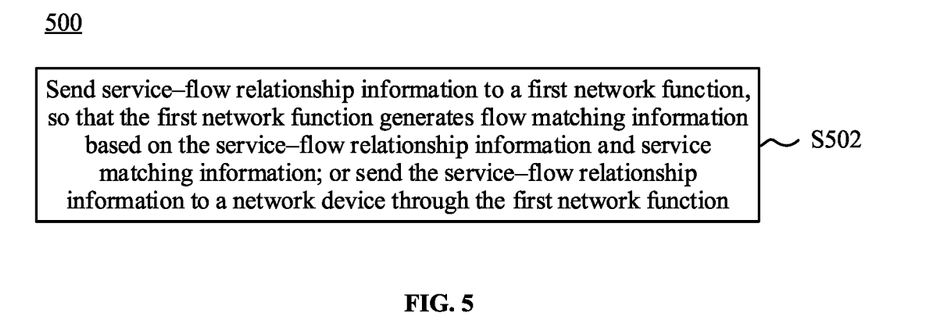
FIG. 5 is a schematic flowchart of a paging method according to still another embodiment of this disclosure.

FIG. 5 is a schematic implementation flowchart of a paging method according to an embodiment of this disclosure, which may be applied on a second network function side, such as an SMF. As shown in FIG. 5, the method 500 includes the following step.

S502: Send service-flow relationship information to a first network function, so that the first network function generates flow matching information based on the service-flow relationship information and service matching information; or send the service-flow relationship information to a network device through the first network function, and certainly, the first network function may further send the service matching information to the network device.

The service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

In the paging method provided in this embodiment of this disclosure, the first network function may receive the service-flow relationship information from the second network function, may also send the service matching information and the service-flow relationship information to the network device, or may further send the flow matching information to the network device, so that the network device can obtain the matching value from the service matching information and the service-flow relationship information based on the flow identifier or "the flow identifier and the session identifier", or obtain the matching value from the flow matching information, thereby resolving the problem that the network device cannot determine the matching value related to a mobile terminated service, and improving communication effectiveness.

Optionally, in an embodiment, the service-flow relationship information includes one or more service-flow relationships, and one target service-flow relationship in the service-flow relationship information includes:

a target flow identifier and one or more pieces of target service information; or
  a target flow identifier, a target session identifier, and one or more pieces of target service information; or
  a target flow identifier, and one or more pieces of target service type information; or
  a target flow identifier, a target session identifier, and one or more pieces of target service type information.

The foregoing describes in detail the paging methods according to the embodiments of this disclosure with reference to FIG. 1 to FIG. 5. A network device according to an embodiment of this disclosure is described below in detail with reference to FIG. 6.

Figure 6:
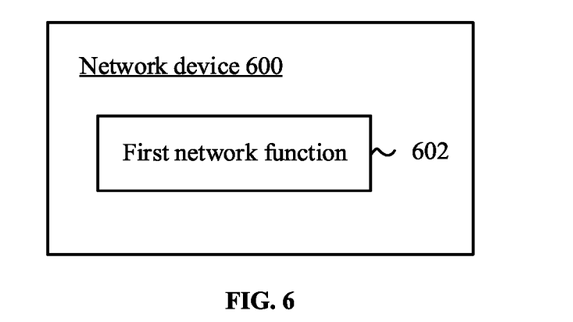
FIG. 6 to FIG. 9 are schematic structural diagrams of network devices according to several embodiments of this disclosure.

FIG. 6 is a schematic structural diagram of a network device according to an embodiment of this disclosure. As shown in FIG. 6, the network device 600 includes:

a first network function 602, configured to send service matching information and service-flow relationship information to another network device, or send flow matching information to the another network device; where
  the service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

In this embodiment of this disclosure, the network function may send the service matching information and the service-flow relationship information, or the flow matching information to the network device, so that the network device can obtain the matching value from the service matching information and the service-flow relationship information based on the flow identifier or "the flow identifier and the session identifier", or obtain the matching value from the flow matching information, thereby resolving the problem that the network device cannot determine the matching value related to a mobile terminated service, and improving communication effectiveness.

Optionally, in an embodiment, the service matching information includes one or more service matching relationships, and one of the service matching relationships includes:

a target matching value and one or more pieces of target service information; or,
  a target matching value and one or more pieces of target service type information; where
  the target service information is used to indicate a service related to the target matching value, and the target service type information is used to indicate a service type related to the target matching value.

Optionally, in an embodiment, the service matching information further includes validity period information.

Optionally, in an embodiment, the target service matching relationship further includes at least one of the following:

one or more pieces of high-priority service information, where a service corresponding to the high-priority service information is capable of preempting a service corresponding to the target service information;
  one or more pieces of high-priority service type information, where a service corresponding to the high-priority service type information is capable of preempting a service corresponding to the target service type information;
  one or more pieces of low-priority service information, where a service corresponding to the low-priority service information is incapable of preempting a service corresponding to the target service information;
  one or more pieces of low-priority service type information, where a service corresponding to the low-priority service type information is incapable of preempting a service corresponding to the target service type information;
  priority information of a service corresponding to the target service information; and
  priority information of a service corresponding to the target service type information.

Optionally, in an embodiment, the flow matching information includes one or more flow matching relationships, and one target flow matching relationship in the flow matching information includes:

a target matching value and one or more target flow identifiers; or,
  a target matching value and one or more target identifier pairs, where the target identifier pair includes the target flow identifier and a target session identifier.

Optionally, in an embodiment, the flow matching information further includes validity period information.

Optionally, in an embodiment, the service-flow relationship information includes one or more service-flow relationships, and one target service-flow relationship in the service-flow relationship information includes:
- a target flow identifier and one or more pieces of target service information; or
- a target flow identifier, a target session identifier, and one or more pieces of target service information; or
- a target flow identifier, and one or more pieces of target service type information; or
- a target flow identifier, a target session identifier, and one or more pieces of target service type information.

Optionally, in an embodiment, the service information and/or the service type information includes at least one of the following:
- a name;
- an identifier; and
- rule information.

Optionally, in an embodiment, the rule information includes at least one of the following:
- one or more IP addresses;
- one or more port numbers; and
- one or more pieces of protocol information; where the IP address includes a number or a wildcard, and the port number includes a number or a wildcard.

For the terminal device 600 in this embodiment of this disclosure, reference may be made to the procedure of the method 100 in the corresponding embodiment of this disclosure, and the units/modules of the terminal device 600 and other operations and/or functions described above are used to implement the corresponding procedure in the method 100, with the same or equivalent technical effects achieved. For brevity, details are not repeated herein.

Figure 7:
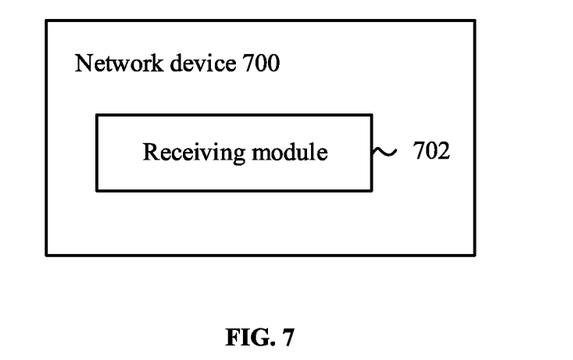

FIG. 7 is a schematic structural diagram of a network device according to an embodiment of this disclosure. As shown in FIG. 7, the network device 700 includes:
- a receiving module 702, configured to receive service matching information and service-flow relationship information from a first network function, or receive flow matching information from the first network function, where
- the service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

In this embodiment of this disclosure, the network device may receive the service matching information and the service-flow relationship information, or the flow matching information from the network function, so that the network device can obtain the matching value from the service matching information and the service-flow relationship information based on the flow identifier or "the flow identifier and the session identifier", or obtain the matching value from the flow matching information, thereby resolving the problem that the network device cannot determine the matching value related to a mobile terminated service, and improving communication effectiveness.

Optionally, in an embodiment, the receiving module 702 is further configured to:
- receive data from a network; and
- send a paging message to a terminal device, where the paging message carries a target matching value; where the data carries a target flow identifier, or carries a target flow identifier and a target session identifier.

Optionally, in an embodiment, the service matching information includes one or more service matching relationships, and one target service matching relationship in the service matching information includes:
- a target matching value and one or more pieces of target service information; or,
- a target matching value and one or more pieces of target service type information; where the target service information is used to indicate a service related to the target matching value, and the target service type information is used to indicate a service type related to the target matching value.

Optionally, in an embodiment, the target service matching relationship further includes at least one of the following:
- one or more pieces of high-priority service information, where a service corresponding to the high-priority service information is capable of preempting a service corresponding to the target service information;
- one or more pieces of high-priority service type information, where a service corresponding to the high-priority service type information is capable of preempting a service corresponding to the target service type information;
- one or more pieces of low-priority service information, where a service corresponding to the low-priority service information is incapable of preempting a service corresponding to the target service information;
- one or more pieces of low-priority service type information, where a service corresponding to the low-priority service type information is incapable of preempting a service corresponding to the target service type information;
- priority information of a service corresponding to the target service information; and
- priority information of a service corresponding to the target service type information.

Optionally, in an embodiment, the flow matching information includes one or more flow matching relationships, and one target flow matching relationship in the flow matching information includes:
- a target matching value and one or more target flow identifiers; or,
- a target matching value and one or more target identifier pairs, where the target identifier pair includes the target flow identifier and a target session identifier.

Optionally, in an embodiment, the service-flow relationship information includes one or more service-flow relationships, and one target service-flow relationship in the service-flow relationship information includes:
- a target flow identifier and one or more pieces of target service information; or
- a target flow identifier, a target session identifier, and one or more pieces of target service information; or
- a target flow identifier, and one or more pieces of target service type information; or
- a target flow identifier, a target session identifier, and one or more pieces of target service type information.

Optionally, in an embodiment, the receiving module 702 is further configured to:
- receive currently active service information from the terminal device; and
- based on the currently active service information, first information, and second information, determine to reject to send the paging message; where
- the first information includes the flow matching information; or the first information includes the service matching information and the service-flow relationship information; and the second information includes the target flow identifier; or the second information includes the target session identifier and the target flow identifier.

For the network device 700 in this embodiment of this disclosure, reference may be made to the procedure of the method 400 in the corresponding embodiment of this disclosure, and the units/modules of the network device 700 and other operations and/or functions described above are used to implement the corresponding procedure in the method 400, with the same or equivalent technical effects achieved. For brevity, details are not repeated herein.

Figure 8:
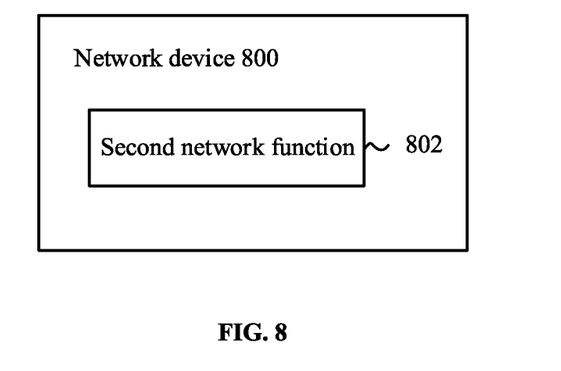

FIG. 8 is a schematic structural diagram of a network device according to an embodiment of this disclosure. As shown in FIG. 8, the network device 800 includes:
- a second network function 802, configured to send service-flow relationship information to a first network function, so that the first network function generates flow matching information based on the service-flow relationship information and service matching information; or send the service-flow relationship information to another network device through the first network function; where
- the service matching information is used for obtaining a matching value based on service information or service type information; the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier.

In this embodiment of this disclosure, the first network function may receive the service-flow relationship information from the second network function, may also send the service matching information and the service-flow relationship information to the network device, or may further send the flow matching information to the network device, so that the network device can obtain the matching value from the service matching information and the service-flow relationship information based on the flow identifier or "the flow identifier and the session identifier", or obtain the matching value from the flow matching information, thereby resolving the problem that the network device cannot determine the matching value related to a mobile terminated service, and improving communication effectiveness.

Optionally, in an embodiment, the service-flow relationship information includes one or more service-flow relationships, and one target service-flow relationship in the service-flow relationship information includes:
- a target flow identifier and one or more pieces of target service information; or
- a target flow identifier, a target session identifier, and one or more pieces of target service information; or
- a target flow identifier, and one or more pieces of target service type information; or
- a target flow identifier, a target session identifier, and one or more pieces of target service type information.

For the network device 800 in this embodiment of this disclosure, reference may be made to the procedure of the method 500 in the corresponding embodiment of this disclosure, and the units/modules of the network device 800 and other operations and/or functions described above are used to implement the corresponding procedure in the method 500, with the same or equivalent technical effects achieved. For brevity, details are not repeated herein.

Figure 9:
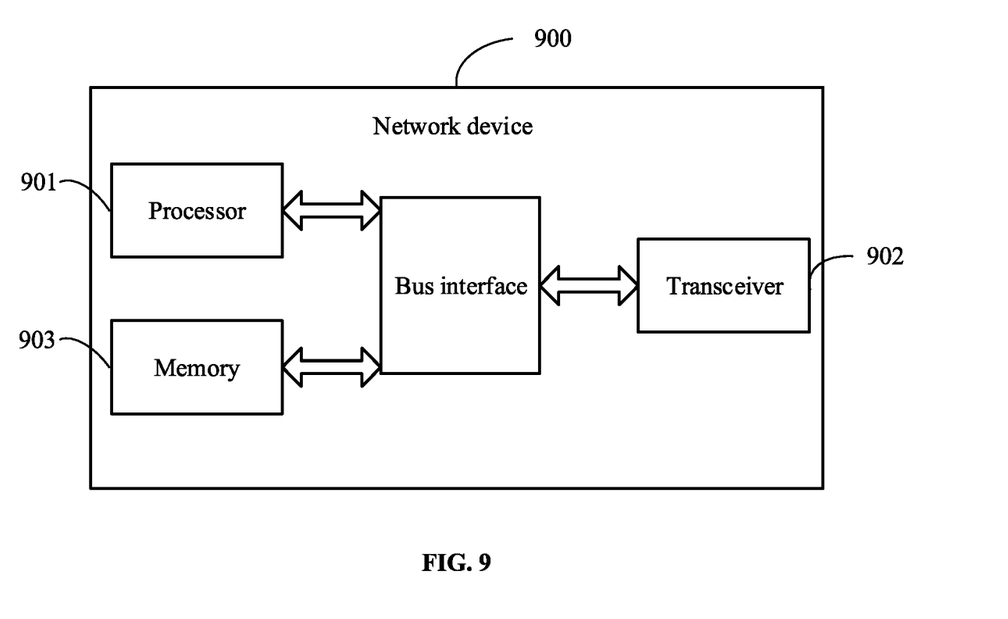

FIG. 9 is a structural diagram of a network device to which an embodiment of this disclosure is applied. The network device is capable of implementing details of any one of the method embodiments 100 to 500, with the same effects achieved. As shown in FIG. 9, a network device 900 includes a processor 901, a transceiver 902, a memory 903, and a bus interface.

In this embodiment of this disclosure, the network device 900 further includes a computer program stored in the memory 903 and capable of running on the processor 901. When the computer program is executed by the processor 901, steps of any one of the methods 100 to 500 are implemented.

In FIG. 9, a bus architecture may include any quantity of interconnected buses and bridges, and specifically connects together circuits that are of one or more processors represented by the processor 901 and of a memory represented by the memory 903. The bus architecture may further interconnect various other circuits such as a peripheral device, a voltage regulator, and a power management circuit. These are all well known in the art, and therefore are not further described in this specification. The bus interface provides interfaces. The transceiver 902 may be a plurality of components, including a transmitter and a receiver, and provides units for communicating with various other apparatuses on a transmission medium.

The processor 901 is responsible for bus architecture management and general processing. The memory 903 may store data used when the processor 901 performs an operation.

The processor 901 may include but is not limited to a general-purpose processor, a dedicated processor, a special application processor, or a field programmable processor.

The memory 903 may include read-only memory (ROM), random access memory (RAM), magnetic disk storage medium devices, optical storage medium devices, flash memory devices, electrical, optical, or other physical/tangible memory storage devices.

An embodiment of this disclosure further provides a computer-readable storage medium that stores a computer program. When the computer program is executed by a processor, the processes of the foregoing method embodiments 100 to 500 can be implemented, with the same technical effects achieved. To avoid repetition, details are not described herein again. Examples of the computer-readable storage medium include a non-transitory computer-readable storage medium such as a read-only memory (ROM), a random access memory (RAM), a magnetic disk, an optical disc, or the like.

Aspects of this disclosure are described above with reference to the flowcharts and/or block diagrams of the method, the apparatus (system), and the computer program product according to the embodiments of this disclosure. It should be understood that each block of the flowcharts and/or block diagrams, and a combination of blocks in the flowcharts and/or block diagrams, can be implemented by computer program instructions. These computer program instructions may be provided to a processor of a general-purpose computer, a special purpose computer, or another programmable data processing apparatus to produce a machine, such that the instructions, which are executed via the processor of the computer or another programmable data processing apparatus, implement the functions/actions specified in the flowchart and/or block diagram block or blocks. Such a processor may be but is not limited to a general-purpose processor, a dedicated processor, a special application processor, or a field programmable processor. It should be also understood that each block in the block diagrams and/or the flowcharts and a combination of the blocks in the block diagrams and/or the flowcharts may alternatively be implemented by dedicated hardware for executing a specified function or action, or may be implemented by a combination of dedicated hardware and computer instructions.

It should be noted that while the foregoing embodiments have been described herein, the patent protection scope of this disclosure is not limited thereby. Therefore, based on innovative ideas of this disclosure, changes and modifications to the embodiments described herein, or direct or indirect application of the above technical solutions in other relevant technical fields by utilizing equivalent structural transformations or equivalent process transformations made according to the contents of the specification and drawings of this disclosure, are all included within the patent protection scope of this disclosure.

What is claimed is:

1. A paging method, executed by a first network function, wherein the method comprises:
    sending service matching information and service-flow relationship information to a network device, or sending flow matching information to the network device; wherein
    the service matching information is used in the paging method for obtaining a matching value based on service information or service type information;
    the service-flow relationship information is used for obtaining service information or service type information based on a flow identifier, or for obtaining service information or service type information based on a session identifier and a flow identifier; and
    the flow matching information is used for obtaining a matching value based on a flow identifier, or for obtaining a matching value based on a session identifier and a flow identifier;
    wherein the service matching information comprises one or more service matching relationships, and one target service matching relationship in the service matching information comprises:
    a target matching value and one or more pieces of target service information; or,
    a target matching value and one or more pieces of target service type information; wherein
    the target service information is used to indicate a service related to the target matching value, and
    the target service type information is used to indicate a service type related to the target matching value.

2. The method according to claim 1, wherein the service matching information further comprises validity period information.

3. The method according to claim 1, wherein the target service matching relationship further comprises at least one of the following:
    one or more pieces of high-priority service information, wherein a service corresponding to the high-priority service information is capable of preempting resources for a service corresponding to the target service information;
    one or more pieces of high-priority service type information, wherein a service corresponding to the high-priority service type information is capable of preempting a service corresponding to the target service type information;
    one or more pieces of low-priority service information, wherein a service corresponding to the low-priority service information is incapable of preempting a service corresponding to the target service information;
    one or more pieces of low-priority service type information, wherein a service corresponding to the low-priority service type information is incapable of preempting a service corresponding to the target service type information;
    priority information of a service corresponding to the target service information; and
    priority information of a service corresponding to the target service type information.

4. The method according to claim 1, wherein the flow matching information comprises one or more flow matching relationships, and one target flow matching relationship in the flow matching information comprises:
    a target matching value and one or more target flow identifiers; or,
    a target matching value and one or more target identifier pairs, wherein the target identifier pair comprises the target flow identifier and a target session identifier.

5. The method according to claim 4, wherein the flow matching information further comprises validity period information.

6. The method according to claim 1, wherein the service-flow relationship information comprises one or more service-flow relationships, and one target service-flow relationship in the service-flow relationship information comprises:
    a target flow identifier and one or more pieces of target service information; or
    a target flow identifier, a target session identifier, and one or more pieces of target service information; or
    a target flow identifier, and one or more pieces of target service type information; or
    a target flow identifier, a target session identifier, and one or more pieces of target service type information.

7. The method according to claim 1, wherein the service information and/or the service type information comprises at least one of the following:
    a name;
    an identifier; and
    rule information.

8. The method according to claim 7, wherein the rule information comprises at least one of the following:
    one or more IP addresses;
    one or more port numbers; and
    one or more pieces of protocol information; wherein
    the IP address comprises a number or a wildcard, and the port number comprises a number or a wildcard.

9. A paging method executed by a network device, wherein the method comprises:
    receiving service matching information and service-flow relationship information from a first network function, or receiving flow matching information from the first network function; wherein
    the service matching information is used in the paging method for obtaining a matching value based on service information or service type information;

the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier;

wherein the service matching information comprises one or more service matching relationships, and one target service matching relationship in the service matching information comprises:

a target matching value and one or more pieces of target service information; or, a target matching value and one or more pieces of target service type information; wherein the target service information is used to indicate a service related to the target matching value, and the target service type information is used to indicate a service type related to the target matching value.

10. The method according to claim 9, wherein after the receiving service matching information and service-flow relationship information from a first network function, or receiving flow matching information from the first network function, the method further comprises:

receiving data from a network; and sending a paging message to a terminal device, wherein the paging message carries a target matching value; wherein the data carries a target flow identifier, or carries a target flow identifier and a target session identifier.

11. The method according to claim 9, wherein the target service matching relationship further comprises at least one of the following:

one or more pieces of high-priority service information, wherein a service corresponding to the high-priority service information is capable of preempting a service corresponding to the target service information;

one or more pieces of high-priority service type information, wherein a service corresponding to the high-priority service type information is capable of preempting a service corresponding to the target service type information;

one or more pieces of low-priority service information, wherein a service corresponding to the low-priority service information is incapable of preempting a service corresponding to the target service information;

one or more pieces of low-priority service type information, wherein a service corresponding to the low-priority service type information is incapable of preempting a service corresponding to the target service type information;

priority information of a service corresponding to the target service information; and priority information of a service corresponding to the target service type information.

12. The method according to claim 9, wherein the flow matching information comprises one or more flow matching relationships, and one target flow matching relationship in the flow matching information comprises:

a target matching value and one or more target flow identifiers; or, a target matching value and one or more target identifier pairs, wherein the target identifier pair comprises the target flow identifier and a target session identifier.

13. The method according to claim 9, wherein the service-flow relationship information comprises one or more service-flow relationships, and one target service-flow relationship in the service-flow relationship information comprises:

a target flow identifier and one or more pieces of target service information; or a target flow identifier, a target session identifier, and one or more pieces of target service information; or a target flow identifier, and one or more pieces of target service type information; or a target flow identifier, a target session identifier, and one or more pieces of target service type information.

14. The method according to claim 10, wherein the method further comprises:

receiving currently active service information from the terminal device; and based on the currently active service information, first information, and second information, determining to reject to send the paging message; wherein the first information comprises the flow matching information, or the first information comprises the service matching information and the service-flow relationship information; and the second information comprises the target flow identifier; or the second information comprises the target session identifier and the target flow identifier.

15. A paging method executed by a second network function, wherein the method comprises:

sending service-flow relationship information to a first network function, so that the first network function generates flow matching information based on the service-flow relationship information and service matching information; or sending the service-flow relationship information to a network device through the first network function; wherein the service matching information is used in the paging method for obtaining a matching value based on service information or service type information;

the service-flow relationship information is used for obtaining service information or service type information based on a flow identifier, or for obtaining service information or service type information based on a session identifier and a flow identifier; and the flow matching information is used for obtaining a matching value based on a flow identifier, or for obtaining a matching value based on a session identifier and a flow identifier;

wherein the service matching information comprises one or more service matching relationships, and one target service matching relationship in the service matching information comprises:

a target matching value and one or more pieces of target service information; or, a target matching value and one or more pieces of target service type information; wherein the target service information is used to indicate a service related to the target matching value, and the target service type information is used to indicate a service type related to the target matching value.

16. The method according to claim 15, wherein the service-flow relationship information comprises one or more service-flow relationships, and one target service-flow relationship in the service-flow relationship information comprises:

a target flow identifier and one or more pieces of target service information; or a target flow identifier, a target session identifier, and one or more pieces of target service information; or a target flow identifier, and one or more pieces of target service type information; or a target flow identifier, a target session identifier, and one or more pieces of target service type information.

17. A network device, comprising a memory, a processor, and a computer program that is stored in the memory and capable of running on the processor, wherein when the computer program is executed by the processor, the steps of the paging method according to claim 1 is implemented.

18. A non-transitory computer-readable storage medium, wherein the computer-readable storage medium stores a computer program, and when the computer program is executed by a processor, the steps of the paging method according to claim 1 is implemented.

\* \* \* \* \*